United States Patent [19]

Yasuike et al.

[11] 4,096,218

[45] Jun. 20, 1978

[54] METHOD OF PRODUCING FOAMED THERMOPLASTIC RESIN ARTICLES HAVING SMOOTH AND GLOSSY SURFACES FREE FROM SWIRL MARKS AND HAIR CRACKS

[75] Inventors: Akio Yasuike, Tokyo; Tsutomu Odagiri, Hiratsuka, both of Japan; Toshiba Machine Co. Limited, both of Tokyo, Japan

[73] Assignee: Asahi-Dow Limited

[21] Appl. No.: 709,108

[22] Filed: Jul. 27, 1976

Related U.S. Application Data

[63] Continuation-in-part of Ser. No. 379,309, Jul. 19, 1973, abandoned.

[51] Int. Cl.² .............................................. B29D 27/00
[52] U.S. Cl. ...................................... 264/45.5; 264/53; 264/54; 264/328; 264/DIG. 5; 264/DIG. 14; 264/DIG. 83; 428/315
[58] Field of Search ................... 264/54, 55, DIG. 83, 264/DIG. 5, DIG. 14, 45.5, 53, 328; 428/315

[56] References Cited

U.S. PATENT DOCUMENTS

| | | | |
|---|---|---|---|
| 3,058,161 | 10/1962 | Beyer et al. | 264/DIG. 83 |
| 3,268,635 | 8/1966 | Kraus et al. | 264/DIG. 83 |
| 3,399,098 | 8/1968 | Omoto et al. | 264/DIG. 5 |
| 3,697,204 | 10/1972 | Kyritsis et al. | 264/DIG. 83 |
| 3,773,873 | 11/1973 | Spaak et al. | 264/54 X |
| 3,776,989 | 12/1973 | Annis et al. | 264/DIG. 83 |

FOREIGN PATENT DOCUMENTS

| | | | |
|---|---|---|---|
| 48-20023 | 6/1973 | Japan | 264/DIG. 83 |
| 1,226,135 | 3/1971 | United Kingdom | 264/45.5 |

*Primary Examiner*—Philip Anderson
*Attorney, Agent, or Firm*—Cushman, Darby & Cushman

[57] ABSTRACT

A method of producing foamed thermoplastic resin articles having smooth and glossy surfaces free from swirl marks and hair cracks, which comprises melting a thermoplastic resin containing a condensable blowing agent and an organic chemical blowing agent, injecting, in full shot, the molten resin into a mold cavity to which a pressurized gas is being applied during said injection, terminating the application of the pressurized gas to the mold cavity, enlarging the volume in said molded cavity by movement of a mold wall, and thereafter cooling and solidifying the resin to form the foamed articles.

4 Claims, 5 Drawing Figures

METHOD OF PRODUCING FOAMED THERMOPLASTIC RESIN ARTICLES HAVING SMOOTH AND GLOSSY SURFACES FREE FROM SWIRL MARKS AND HAIR CRACKS

RELATED APPLICATION

This application is a continuation-in-part of our application Ser. No. 379,309, filed on July 16, 1973, now abandoned.

BACKGROUND OF THE INVENTION

This invention relates to a method of producing foamed thermoplastic resin articles having smooth and glossy surfaces free from swirl marks and hair cracks.

In the conventional injection molding methods for foamed articles, resin containing a foaming agent is thermally plastified under a pressure which is capable of inhibiting the premature foaming thereof, and such thermally plastified, expandable resin is injected into a mold cavity. By way of such injection methods, Short Shot processes and Full Shot processes have been in use.

In the short shot process, the force of the expandable resin which is exerted in filling the mold cavity is so small that the expansion ratio of articles thus obtained is not high enough and that difficulty is involved in transferring the incuse design on the internal wall of the mold cavity on to the surface of the molded article in a faithful manner. Further, development of swirl marks is seen. Presence of such swirl marks detracts from the external appearance of the molded article and also makes the application of a coating difficult. To remove swirl marks additional finishing processes are required such as sanding, filling and polishing for which much labor is necessary. Furthermore, where the incuse design on the internal wall of the mold cavity is transferred as above, the aforesaid additional finishing processes are nearly impossible.

According to such U.S. Pat. as Nos. 3,211,605, 3,218,375 and 3,384,691, while the inner portion of resin which is full-shot into the mold cavity is a green and expandable soft state, a part of the said expandable resin is caused to be discharged out of the mold cavity by virtue of foaming and expansion so as to obtain an expanded article. In such methods, however, it is uneconomical to allow the plastified resin to discharge and another drawback inherent to such methods is that a high expansion ratio can not be hoped for. It is extremely difficult, what is more, to retain the weight of resin discharged each time at a constant value, with resultant substantialy fluctuation in the weight of molded articles obtained.

U.S. Pat. No. 3,058,161, Japanese patent publication No. 1964-22213 and others disclose a procedure whereby, after thermoplastified expandable resin is injected to fill into the mold cavity, within the period where the inner portion of the resin in the said mold cavity is still green and expandable, the aforesaid mold cavity is expanded to the predetermined capcity and shape so as to allow the resin to foam and expand. Because, in this method, the inner volume of the mold cavity is expanded forcedly by use of external force, the resin existing inside the mold cavity may, in so far as it possesses a foaming force being sufficient to follow and meet the aforesaid expansion of the inner volume of the mold cavity, be foamed, at an adequate expansion ratio, into articles including those with relatively thin secion thickness.

By means of the injection molding for foamed articles described in the foregoing, however, no fundamental solution has been attained to the trouble of swirl marks which is inherent to injection molded foamed articles. During time when the resin injected into the mold cavity flows inside the mold cavity while undergoing expansion, cells may be entrapped in the boundary surface between the wall of the mold cavity and the resin and the cell may be crushed and slipped by the flow of the resin, so that swirl marks may occur on the surfaces of molded articles as traces thereof.

Various methods have been devised aiming at prevention of swirl marks. U.S. Pat. No. 3,306,960 and No. 3,384,691, etc., for instance, disclose a method of heating the inner walls of the mold cavity to nearly about the softening point of the resin to be full-shot. However, such a method consisting of repeating the cycles of heating and cooling the mold with a large heat capacity entails consumption of thermal energy. This is not only very uneconomical, but longer cycle time is required for performing the molding as a matter of course due to the limitations of speed of heat transmission through the mold itself, thereby resulting in a fatal disadvantage of diminished productivity.

"Modern Plastics" a McGraw-Hill Publication, published in the United States on March, 1969, has presented the following method: In injecting thermoplastified expandable resin into the mold cavity, the mold cavity is filled in advance with a gas which is pressurized at a level registering in excess of the foaming pressure of the said injected resin, and then the thermoplastified resin is full-shot into the mold cavity. In such instance, the pressurized gas in the mold cavity is discharged through the relief valve, etc. by the injected resin having even higher a pressure. Then, while the inner portion of the resin is still green and expandable, the pressure inside the injection cylinder is reduced, and the inner portion of the resin in the aforesaid mold cavity is fed back into the above-mentioned injection cylinder for its expansion. Essentially, this is a method that has been improved over the aforesaid U.S. Pat. Nos. 3,211,605, 3,218,375 and 3,384,691; however, by means of those methods, as referred to above, increase in expansion ratio can not be hoped for, and wastage is inevitable because resin that has been plastified once is discharged out of the mold, into the injection cylinder, etc. Further, it is unavoidable that the density of molded articles will fluctuate greatly.

It is an object of the present invention to provide a method of producing foamed thermoplastic resin articles having smooth and glossy surfaces which are free from swirl marks and hair cracks.

Another objective of the present invention is to provide a method of economically producing the aforesaid articles enabling a faithful reproduction of an incuse design on the inner wall of the mold cavity on the molded articles as well as easy molding of articles including those with a relatively high expansion ratio.

SUMMARY OF THE INVENTION

In accordance with the present invention, there is provided a method of producing a foamed thermoplastic resin article having a smooth and glossy surface free from swirl marks and hair cracks, which comprises melting a thermoplastic resin containing, per 100 parts by weight of said resin, 0.5 to 8 parts by weight of a condensable blowing agent having a boiling point of −10° to 70° C. at atmospheric pressure and 0.05 to 0.5 parts by weight of an organic chemical blowing agent, injecting, in full shot, the molten resin into a mold cavity to which a pressurized gas of 2 to 10 kg/cm² is being applied during said injection so as to prevent foaming, thereafter the pressurized gas being discharged from the mold cavity, by injection of foamable resin terminating the application of the pressurized gas to the mold cavity, enlarging the volume in said mold cavity by movement of a mold wall at the time when a solid skin having been formed around the inner surface of said mold cavity and the resin within the solid skin being still in the molten state, thereby foaming and expanding the resin, and thereafter cooling and solidifying the resin to form the foamed article.

BRIEF DESCRIPTION OF THE DRAWINGS

The method of the present invention is explained below with reference to the accompanying drawings wherein:

FIG. 1 and FIG. 3 are cross-sectional views of examples of apparatuses suitable for practising the present method, whereas

DETAILED DESCRIPTION OF THE INVENTION

Figure 1:
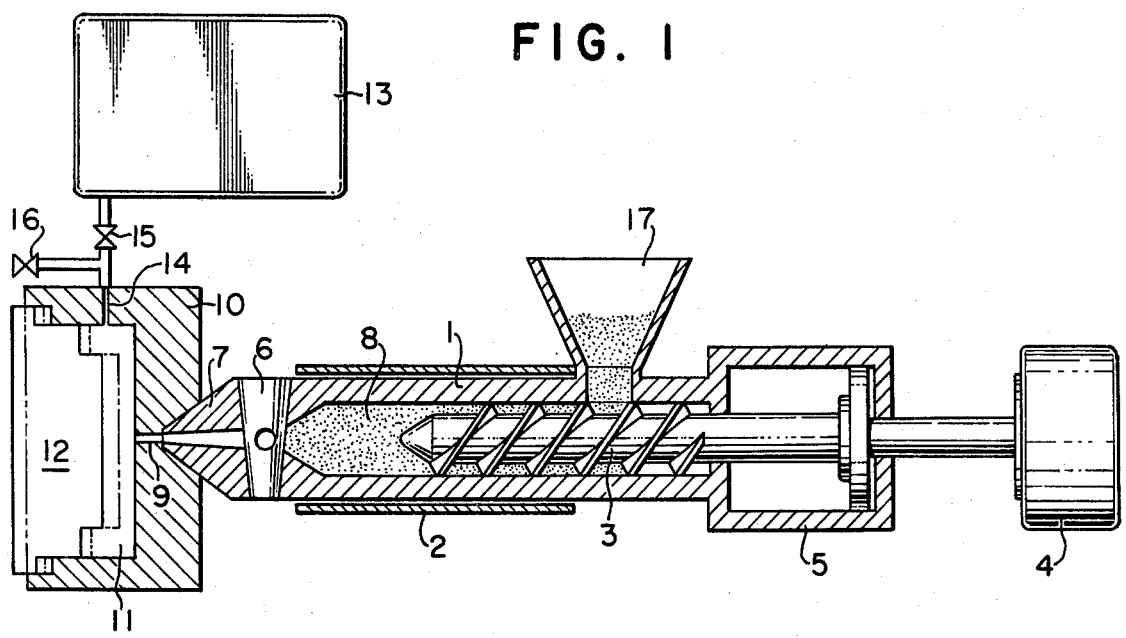

In the present invention, by way of blowing agent, per 100 parts by weight of the resin, 0.5 to 8 parts by weight of a condensable blowing agent having a boiling point of −10° to 70° C at atmospheric pressure is used jointly with 0.05 to 0.5 part by weight of an organic chemical blowing agent.

As blowing agents for injecton molding for foamed articles, in general, organic chemical blowing agents such as azodicarbonamide and hydroxybisbenzene sulfonyl hydroxide are used. Those blowing agents, however, require, while expandable resin is being full-shot into the mold cavity by means of the aforesaid pressurized mold method, a pressure of a pressurized gas registering not less than 20 kg/cm² for the purpose of inhibiting premature expansion of the resin. In the present specification, all pressures are by gauge pressure. Such high pressure entails various economic burdens for its handling safety and the mold itself is required to be constructed to meet such, high load. Further, it is necessary that the clamping force, the largest element of the costs of the injection molding machine, be increased in accordance with the pressure of the pressurized gas. Further, since a pressurized gas seal is employed, structure, etc. of gasket required become comparatively expensive. As such a pressurized gas, the use of economically low cost air is desirable, but air under such high pressure gives rise to an undesirable defect of the occurrence of the so-called "black streak" on the molded article. This occurs when flammable vapor which is generated from the resin while it is being injected is combusted by detonation. This, therefore, calls for an uneconomical use of gases which are themselves incapable of supporting combustion such as nitrogen gas and carbonic acid gas. Accordingly, it is quite natural to seek conditions allowing the use of air having a pressure of not more than 10 kg/cm².

However, in so far as organic chemical blowing agents like those referred to above are employed, to prevent occurrence of swirl marks by use of a gas with a low pressure as low as 10 kg/cm² or lower as mentioned above, the maximum permissible amount of an organic chemical blowing agent that can be used is no more than 0.2 to 0.3% by weight of the resin, and then only an insufficient expansion ratio of the foamed articles can be hoped for with such an amount.

The circumstances described in the foregoing leads to use of a condensable blowing agent. It has been found, in an attempt to produce a molded article having no swirl marks by use of a condensable blowing agent, that a totally new kind of difficulty, i.e. a phenomenon of the occurrence of fine hair shaped cracks on the molded article or hair cracking takes place. This undesirable phenomenon tends to occur with a styrenic resin. Hair cracks begin to come into development several hours after being molded and occur frequently during the cold season, in particular. Occurrence of such a phenomenon deteriorates the physical properties of the molded article turning it highly brittle, and thus the article no longer serves as structural foam.

This hair cracking phenomenon is considered attributable to the so-called solvent cracking effects, where any recondensed residual blowing agent exerts a solvent-like action on the internal strain remaining in the superficial layer of the molded foamed article during the molding process. Such hair cracks are a new phenomenon of difficultly despite the fact that an injection molded foamed articled free from swirl marks and with smooth and glossy surfaces has been obtained. The conventional injection molded foamed articles foam and expand up to the superficial layer, as is obvious from generation of swirl marks, and thus strain seems to have been released thereby precluding occurrence of hair cracks.

Since the hair cracking phenomenon is assumed to have been derived from a solvent-like action of the recondensed residual blowing agent, it is necessary to determine conditions where any residual blowing agent can be prevented from getting condensed on the molded article that has been cooled down to room temperature.

It has been found that, when an organic chemical blowing agent is used together with a condensable blowing agent, gases from the organic chemical blowing agent, such as nitrogen gas, carbonic acid gas and ammonia which are difficult to condense serve to dilute the gases generated from the condensable blowing agent so as to preclude recondensation of the condensable gas.

In the present invention, such organic chemical blowing agents are used jointly not as the nucleating agent as in the conventional molding methods, but such joint use constitutes one of a series of requirements for economically producing the injection molded foamed articles, which are industrially important, having smooth and glossy surfaces free from swirl marks.

As the main blowing agent in the present invention, a condensable blowing agent having a boiling point −10° to 70° C is used. For example, saturated or unsaturated hydrocarbon, halogenated hydrocarbon, alcohol, ketone, or ether may be used. As specified examples, n-butane, isobutane, n-pentane, isopentane, neopentane, n-hexane, isohexane, 3-methyl pentane, neohexane, petroleum ether, methanol, acetone, diethyl ether, Freon 11, Freon 114, etc. may be cited. They may be employed singly or as their mixture. Use of a condensable blowing agent containing a small quantity of a low boiling point compound like propane, or a high boiling point compound such as octane does not affect practice of the present invention at all.

A condensable blowing agent is used in the quantity of 0.5 to 8 parts by weight, preferably 1 to 3 parts, per 100 parts by weight of the resin. When the quantity of the condensable blowing agent is less than 0.5 parts by weight, an expansion ratio desired is not attainable, whereas when the quantity is more than 8 parts by weight, the article obtained by use of such an amount has no practical performance because it has a high expansion ratio so that it lacks the performance as the structural foam.

The type and quantity of a condensable blowing agent to be used are selected mainly in accordance with economics, the kind of the resin, desired expansion ratio, etc. An expansion ratio to be attained is naturally nearly proportional to the ratio of the blowing agent used to the resin, but such an expansion ratio declines as the section thickness of the molded articles decreases. A proper quantity of a blowing agent to be used, therefore, should be decided by trials, and in the use of blowing agent of, say n-pentane for obtaining a molded article with the final section thickness of 15 mm at an expansion ratio of two times, the quantity of the blowing agent to be used is about 1.2 percent. The quantity of blowing agent may be increased or decreased in accordance with the aforesaid standard for individual section thickness and expansion ratio as desired.

The blowing agent, in general, is available commercially in the form of being impregnated into the resin. Such impregnated resin is used after being diluted with non-impregnated resin, and it is also possible to use impregnated resin only. Further, in place of such impregnated resin, the blowing agent in the predetermined quantity may be fed into the plastifying cylinder of the injection molding machine by use of a constant rate feed pump to be mixed and kneaded with the resin.

For the aforesaid impregnating, various methods are known and their representative methods are the following:

1. A method whereby a blowing agent such as petroleum ether in the predetermined quantity is caused to dissolve with the monomer during polymerization for suspension polymerization.

2. A method whereby resin pellets are stirred and suspended in water in an autoclave, and blowing agent is caused to impregnate into the resin in the presence of heat (40° C – 80° C) and pressure.

3. A method whereby while the resin is being kneaded in an extruding machine, blowing agent is fed under pressure to the resin by use of a constant rate feed pump to be mixed and kneaded together and extruded as strand directly into a water bath through a die for quick cooling, and cut and pelletized thereafter.

Organic chemical blowing agents that may be employed in the present invention include:
Azodicarbonamide,
Azobisisobutyronitrile,
Diazoaminobenzene,
N,N'-Dimethyl-N,N'-dinitrosoterephthalamide,
N,N'-Dinitroso-pentamethylenetetramine,
Toluene-4-sulfonyl hydrazide,
Diphenylsulfon-3,3'-disulfonylhydrazide, and
4,4'-Oxybis (benzene sufonylhydrazide).

In so far as occurrence of swirl marks can be prevented on the surface of the injection molded foamed article, the ratio of organic chemical blowing agent to be added may be maximized. The ratio of such addition, however, is limited by the pressure of the compressed gas used in the mold cavity, and is also variable depending on such factors as the type of the resin, temperature, and the kind of blowing agent used. In practising the present invention, the limits of addition of the blowing agent should firstly be determined for precluding the occurrence of swirl marks, and it is desirable that the amount of addition of the organic chemical blowing agent should be determined depending on such a limited amount while considering for additional safety.

Because the pressure of the compressed gas used in the present invention is from 2 to 10 kg/cm$^2$, the ratio of organic chemical blowing agent to be added, per 100 parts by weight of the resin, is 0.05 to 0.5 part by weight, preferably 0.1 to 0.3 part by weight. When the organic chemical blowing agent added is less than 0.05 part by weight, the effects for the prevention of hair cracks are unattainable, whereas if it is more than 0.5 part by weight, swirl marks tend to occur.

To such organic chemical blowing agents, in consideration of plastifying temperature, etc. of the resin, and for properly adjusting its decomposing temperature, speed, etc., metallic salt, etc. are added in a proper quanity in most cases. The plastifying temperature of each resin is to be changed depending on the type of the resin, degree of polymerization, etc., and it should be determined in consideration of flow, heat resistance, oil resistance, transparency, toughness, rigidity and other desired properties. It is desirable, in general, that the plastifying temperature should be fixed at the least at 30° C higher than Vicat softening point of the resin.

A condensable blowing agent exerts a far-reaching plasticizing action on the resin, and the plastifying temperature of the resin is greatly dependent upon the amount of blowing agent used. For instance, plastifying polystyrene having a weight average molecular weight of 150,000 is generally performed at 160° C or higher and normally at 190° C – 220° C, but as n-pentane is added thereto by 6 percent, it may be thermoplastified at 120° C – 130° C.

In practising the present invention, it is desirable that, in order to obtain satisfactory expanded foams, a nucleating agent such as talc be used in the quantity, per 100 parts by weight of the resin, of 0.5 to 2 parts by weight.

Thermoplastifiable resin that can be used in the present invention may be ay resin in so far as it can form foamed articles through extrusion molding or injection molding. Some of the preferable resins for use in the present invention are olefin polymers such as high, medium or low density polyethylenes and polypropylenes, and styrenic resin such as polystyrenes, rubber-incorporated polystyrenes, ABS resins, SAN resins and styrene-methyl methacrylate copolymer resins.

In the present invention, resins that meet the purposes of the molded articles are employed in terms of physical properties required of molded articles such as in heat resistance, toughness, rigidity and transparency. Those physical properties are changeable depending upon the means molecular weight of the polymer, distribution of the degree of polymerization, rubber content, the ratio of comonomers and other factors.

Pressurized gases that can be used in the present invention are air and non-condensable gas, and air is preferable. In the present invention, pressure of the pressurized gas is 2 to 10 kg/cm$^2$, preferably 4 to 8 kg/cm$^2$. When the pressure registers less than 2 kg/cm$^2$, premature foaming can not be inhibited adequately, whereas as the pressure is more than 10 kg/cm², various disadvantages as mentioned above are involved.

Next, the embodiments of the present invention will be clarified by referring to the attached drawings.

In FIG. 1, a cylinder 1 is equipped with a heater 2 in its outer circumference and the inside of the cylinder is provided with a screw 3 that turns by a motor 4 and is able to move back and forth in the axial direction by an injection hydraulic cylinder 5. This screw 3 provides for transferring, thermally plastifying, injection, etc. of the resin. One end of the cylinder 1 is connected through a cock 6 to an injection nozzle 7. In injecting a thermoplastified resin 8, the resin is channeled through the injection nozzle 7 and a sprue 9 of a mold 10 into a mold cavity 11. The mold cavity 11 is composed of the inner wall of the body of the mold 10 and a slide member 12 of the mold. The mold cavity 11 is connected to a source of compressed gas 13 by way of a gas passage hole 14 and a valve 15, and further it is exposed to the atmosphere through an exhaust gas valve 16.

The following is a description of the method of operating the aforesaid equipment. Firstly, leave the cock 6 closed, and supply a hopper 17 installed in communication with the injection cylinder 1 with a feed resin 8 with which the blowing agent is mixed. The said resin is pushed towards the nozzle 7 at the left end inside the injection cylinder 1 by the rotary drive exerted by the screw. During this time the resin is thermoplastified by heating with the heater 2 and though kneading and heat buildup rendered by the revolution of the screw 3, collected in the space existing between the cock 6 in the cylinder 1 and the left end of the screw 3. The screw 3, depending on the volume thus accumulated, goes back towards the right side inside the cylinder 1. The thermoplastified resin 8, during such process, is retained pressurized by the injection hydraulic cylinder 5 installed at the right end of the screw 3 so as to inhibit its foaming. As the pressure to be applied is higher, then better effects of the kneading are obtained, but it is to be set at a proper value within the range 20 through 300 kg/cm² for precluding the possibility of overheating, decline in the volume of transfer, excessive load, etc. As the resin collects in the predetermined quantity, the screw 3 is stopped from rotating.

In the meantime, the slide member 12 of the mold is at the position of the chain line, the exhaust gas valve 16 is left closed, the valve 15 open, and the mold cavity 11 is filled with compressed gas from the source of compressed gas 13 by way of the gas passage hole 14. It is desirable that the mold cavity be retained airtight by use of a customarily used gasket, etc.

Next, for performing the injection, firstly the cock 6 is opened, and at the same time, the screw 3 is caused to move towards the left side by virtue of the pressure boosting action of the injection hydraulic cylinder 5. This screw 3 acts as an injection piston and injects and fills the aforesaid expandable resin 8 collected in front into the mold cavity 11. In this instance, by means of the higher pressure of the injected resin, compressed gas in the above-mentioned mold cavity 11 is caused to flow backward to be discharged into the source of compressed gas 13 through the gas passage hole 14 and the valve 15. The inner capacity of this source of compressed gas 13 is preferably sufficiently large in comparison with the capacity of the mold cavity 11. In the case of a compressed gas feed system where such backward transfer of the compressed gas is infeasible, a relief valve that functions at 10 kg/cm² approximately is provided. Until the mold cavity 11 has thus been filled with injected resin 8, the mold cavity 11 is retained under compressed gas so as to check premature foaming.

Upon completion of the injection, the cock 6 is closed, and then the valve 15 is closed to interrupt feed of the compressed gas, and thereafter the exhaust gas valve 16 is opened to terminate the application of the pressurized gas to the mold cavity. Under such condition, however, the resin can not foam and expand as it is held restricted by the walls of the mold cavity 11. The slide member 12 of the mold is retracted as far as the position of the solid line, and the inner volume of the mold cavity 11 is enlarged to allow foaming and expanding to take place. The resin thus foams and expands at an expansion ratio being equivalent to the ratio of increase of the inner volume of the mold cavity 11.

Timing of the expansion of the mold cavity in this instance is very important. Making the non-foamed skin layer as thin as possible is effective not only for the improvement of the expansion ratio but is also instrumental in making less noticeable the fault from expansion of the mold cavity. Such a thin skin layer can be obtained by commencing to expand the mold cavity as soon as possible following the completion of the injection. Conversely, in case where a skin layer with a greater thickness is desired, timing of expanding the mold cavity is to be delayed, but this in turn, results in conspicuous faults as referred to above and therefore enlargement of the mold cavity is to be effected within 10 seconds following the completion of the injection, in which case the maximum thickness of the skin layer is about 3 mm. The mold should be enlarged after the lapse of 5–6 seconds from the time when, injection is completed as shown in examples. If the enlargement of the mold is effected too early after completion of injection, resin still in the molten state inside breaks through the skin owing to latent foaming ability thereof, because the skin is not completely solid yet.

The speed at which the mold cavity is enlarged is also very important. For reasons similar to those cited above, it is desirable that the enlargement speed of the mold cavity in general should be sufficiently high. In the event that, however, the enlargement speed of the mold cavity should be excessively high, the expansion speed of the resin can not meet such speed, and gaps can be produced between the resin and the inner walls of the mold cavity, thereby resulting in defective molded articles. It is preferable that the enlargement of the mold cavity should be accomplished within 10 seconds. 5–6 seconds are most preferable as shown in examples.

Further, terminating the application of the pressurized gas to the mold cavity may be timed at any optional point between the completion of injection and the starting of enlargement of the mold. The compressed gas requires some time until it is discharged out of the mold cavity due to resistance present in the passage. In order to compensate for such a time lag, therefore, it is desirable that stopping of the feed of compressed gas and starting of the release be executed a few seconds before completion of the injection of the resin.

It is extremely difficult, even when the foregoing measures and steps are taken, to obtain skin layers measuring 0.3 mm or less in thickness, and it usually ranges from 0.5 to 0.8 mm.

Next, the molded article in the mold cavity 11 is cooled and solidified to be withdrawn from the mold.

The above completes one molding cycle. Duration of time required therefore is dependent mainly upon the section thickness of an article to be molded. When the section thickness of articles for example is 4 mm, 20 mm and 50 mm, time required is about 90 sec., 180 – 240 sec., and 500 – 600 sec. respectively.

It goes without saying that, completing the aforesaid injection, the screw 3 again revolves to be in the process of collecting resin for the subsequent cycle.

Although the expansion ratio of a molded article is determined definitely by the enlargement ratio of the mold cavity 11, the expansion ratio of the resin is limited depending on the formulation of the resin, desired thickness of the skin, desired section thickness of the molded article, etc., and in some cases such defects as depression and void can be sustained on the surface of the molded article due to the deficiency of the foaming force. The limitations, thus, are determined by trails in each case.

Furthermore, since unfoamed skin layer exists on the molded article, it is easily understandable that difficulty is unavoidable to obtain substantially expanded molded articles having less than 4 mm in their section thickness.

Figure 2:
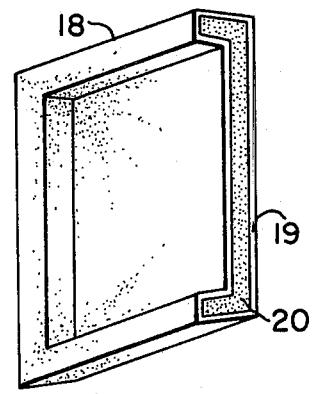
FIG. 2 is a cross-sectional perspective end view of the article obtained by means of the present method.

FIG. 2 is indicative of a cross-sectional perspective end view of an injecton molded foamed article that has been made in the preceding manner. The molded article comprises smooth and glossy surfaces 18 free from swirl marks, unexpanded skin layer 19, and a porous inner portion 20.

Figure 3:
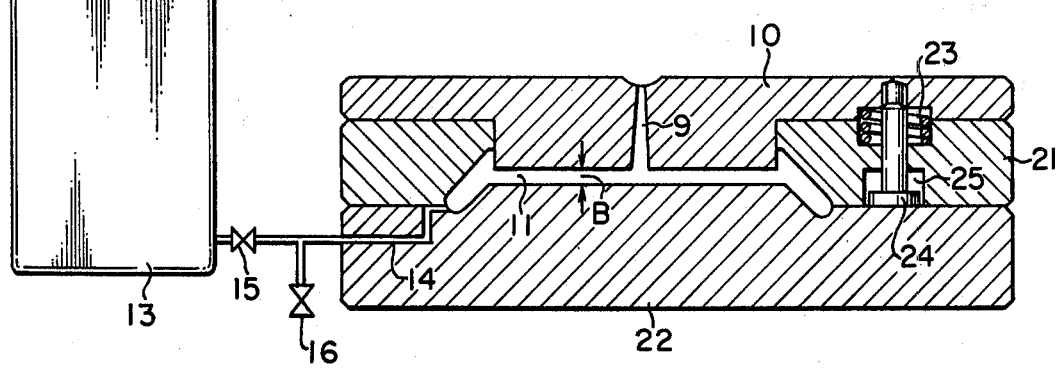
Figure 4:
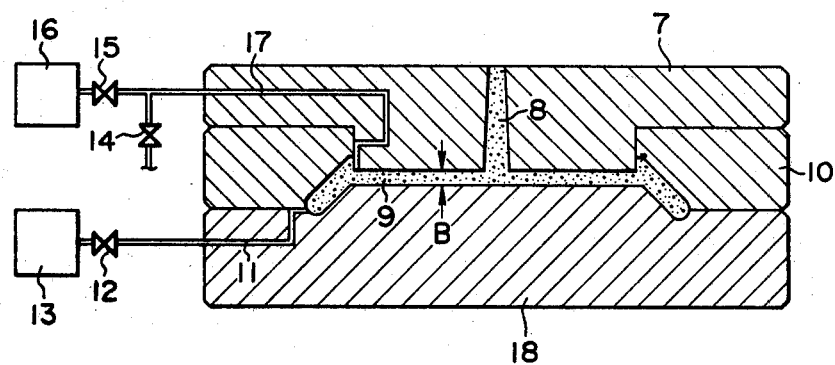
Figure 5:
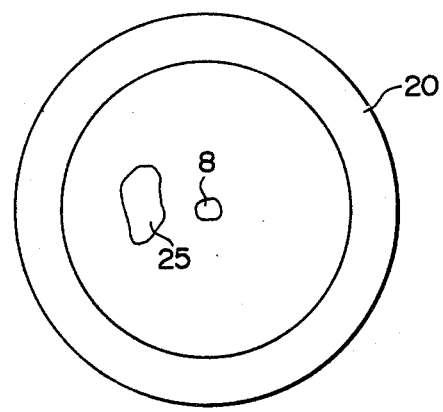

FIG. 3 illustrates a part of another piece of equipment which is employed in practising the method of the present invention. It is different from that shown in FIG. 1 in that two separate slide members 21 and 22 are provided for the mold, and that a spring 23 and a stopper pin 24 are provided so as to cause the slide members 21 and 22 to move simultaneously during the enlargement of the mold. One end of the stopper pin is fixed to the mold 10, the other end is positioned inside a hollow cavity 25 provided in the slide member 21 and thus the distance of travel by the slide member 21 is restricted. Such distance of travel is equivalent to the distance over which the mold is enlarged. The other items are the same as those shown in FIG. 1.

The present method is further illustrated below with reference to the following examples.

EXAMPLE 1

100 parts by weight of a polystyrene having an average molecular weight of 150,000 was incorporated with 3 parts by weight of n-pentane, 1 part by weight of a commercially available powdery talc and 0.1 part by weight of azodicarbonamide type blowing agent having a decomposition temperature of 145° C. This resin was used as the starting material and fed to a commercially available 10 ounce-volume, screw in-line type injection molding machine as shown in FIG. 1.

The exhaust valve 16 was closed and the valve 15 was opened to introduce a pressurized air of 8 kg/cm$^2$ into the mold cavity 11. The resin 8 was melted in the cylinder 1 and injected, in full shot, through the nozzle 7 and the sprue 9 into the mold cavity 11, thereby the pressurized air was discharged completely from the mold cavity. The temperature of the resin at the time of injecton was 150° C. and the injection pressure was 600 kg/cm$^2$. 0.5 Second before the completion of the injection, the valve 15 was closed and the valve 16 was opened to terminate the application of the pressurized air to the mold cavity. 6 Seconds after the completion of the injection, the mold sliding member 12 was moved in 5 seconds to enlarge the mold cavity by three times, whereby the resin was foamed and expanded. After cooling the mold for 2 minutes and 30 seconds, the molded article was taken out of the mold cavity.

The molded article had a smooth surface entirely free from swirl marks and had a skin layer of about 1.5 mm. in thickness on the outer periphery thereof, and the expansion ratio of the molded article was about 3.

EXAMPLE 2

A resin mixture comprising 30 parts by weight of a polystyrene (Styron 683 produced by Asahi Dow Limited), 50 parts by weight of a rubber-reinforced polystyrene (Styron 492 produced by Asahi Dow Limited) and 20 parts by weight of a 6% n-pentane-containing polystyrene having an average molecular weight of 150,000 was incorporated with 1.0 part by weight of a commercially available powdery talc and 0.4 part by weight of an azodicarbonamide type blowing agent having a decomposition temperature of 160° C. This resin mixture was subjected to injection molding using the mold shown in FIG. 3.

The exhaust valve 16 was closed and the valve 15 was opened to introduce a pressurized air of 8 kg/cm$^2$ into the mold cavity 11 having an inner volume of 3.6 liters. Subsequently, the above-mentioned resin mixture was injected at 180° C. and 800 kg/cm$^2$ from the injection machine having an injection capacity of 4.8 liters into the mold cavity 11, thereby the pressurized air was discharged completely from the mold cavity. 0.5 Second before the completion of the injection, the valve 15 was closed and the exhaust valve 16 was opened to terminate the application of the pressurized air to the mold cavity. 5 Seconds after the completion of the injection, the cavity gap B was enlarged from 5 mm. to 10 mm. in 6 seconds, whereby the resin was foamed and expanded. After cooling the mold for 2 minutes, the molded article was taken out of the mold cavity. The thus obtained molded article was a foam having an expansion ratio of 1.8. The surface of the molded article was entirely free from swirl marks and undesirable dents, and the cross-section thereof was composed of an outer skin layer of 1.0 mm. in thickness and fine foamed cells of 0.05 to 0.2 mm. in diameter.

Comparative Example 1

A resin mixture comprising 50 parts by weight of a polystyrene (Styron 683 produced by Asahi Dow Limited) and 50 parts by weight of a rubber-reinforced polystyrene (Styron 492 produced by Asahi Dow Limited) was incorporated with 1.0 part by weight of a commercially available powdery talc and 1.5 parts by weight of an azodicarbonamide type blowing agent having a decomposition temperature of 160° C. This resin mixture was subjected to injection molding using the mold having an inner volume of 3.6 liters shown in FIG. 3. The above-mentioned resin mixture was injected at 180° C. and 800 kg/cm$^2$ from the injection machine having an injection capacity of 4.8 liters into the mold cavity 11. 5 Seconds after the completion of the injection, the cavity gap B was enlarged from 5 mm. to 10 mm. in 6 seconds, whereby the resin was foamed and expanded. After cooling the mold for 2 minutes, the molded article was taken out of the mold cavity. The thus obtained molded article was a foam having an expansion ratio of 1.8. The surface of the molded article had swirl marks and the cross-section thereof was composed of an outer skin layer of 1.0 mm. in thickness and fine foamed cells of 0.05 to 0.2 mm. in diameter.

Comparative Example 2

A resin mixture comprising 30 parts by weight of a polystyrene (Styron 683 produced by Asahi Dow Limited), 50 parts by weight of a rubber-reinforced polystyrene (Styron 492 produced by Asahi Dow Limited) and 20 parts by weight of a 6% n-pentane-containing polystyrene having an average molecular weight of 150,000 was incorporated with 1.0 part by weight of a commercially available powdery talc. This resin mixture was subjected to injection molding using the mold having an inner volume of 3.6 liters shown in FIG. 3. The above-mentioned resin mixture was injected at 180° C. and 800 kg/cm² from the injection machine having an injection capacity of 4.8 liters into the mold cavity 11. 5 Seconds after the completion of the injection, the cavity gap B was enlarged from 5 mm. to 10 mm. in 6 seconds, whereby the resin was foamed and expanded. After cooling the mold for 2 hours, the molded article was taken out of the mold cavity. The thus obtained molded article was a foam having an expansion ratio of 1.8. The surface of the molded article had swirl marks and the cross-section thereof was composed of an outer skin layer of 1.6 mm. in thickness and rough foamed cells of more than 0.3 mm. in diameter.

Comparative Example 3

A resin mixture comprising 50 parts by weight of a polystyrene (Styron 683 produced by Asahi Dow Limited) and 50 parts by weight of a rubber-reinforced polystyrene (Styron 492 produced by Asahi Dow Limited) was homogeneously incorporated with 1.0 part by weight of a commercially available powdery talc and 1.5 part by weight of an azodicarbonamide type blowing agent having a decomposition temperature of 160° C. This resin mixture was subjected to injection molding using the mold shown in FIG. 3. The exhaust valve 16 was closed and the valve 15 was opened to introduce a pressurized air of 8 kg/cm² into the mold cavity having an inner volume of 3.6 liters. Subsequently, the above-mentioned resin mixture was injected at 180° C. and 800 kg/cm² from the injection machine having an injection capacity of 4.8 liters into the mold cavity 11, thereby the pressurized air was discharged completely from the mold cavity. 0.5 Second before the completion of the injection, the valve 15 was closed and the exhaust valve 16 was opened to terminate the application of the pressurized air to the mold cavity. 5 Seconds after the completion of the injection, the cavity gap B was enlarged from 5 mm. to 10 mm. in 6 seconds, whereby the resin was foamed and expanded. After cooling the mold for 2 minutes, the molded article was taken out of the mold cavity. The thus obtained molded article was a foam having an expansion ratio of 1.8. The surface of the molded article had swirl marks and the cross-section thereof was composed of an outer skin layer of 1.0 mm. in thickness and fine foamed cells of 0.05 to 0.2 mm. in diameter.

Comparative Example 4

A resin mixture comprising 30 parts by weight of a polystyrene (Styron 683 produced by Asahi Dow Limited), 50 parts by weight of a rubber-reinforced polystyrene (Styron 492 produced by Asahi Dow Limited) and 20 parts by weight of a 6% n-pentane-containing polystyrene having an average molecular weight of 150,000 was incorporated with 1.0 part by weight of a commercially available powdery talc. This resin mixture was subjected to injection molding using the mold shown in FIG. 3. The exhaust valve 16 was closed and the valve 15 was opened to introduce a pressurized air of 8 kg/cm² into the mold cavity 11 having an inner volume of 3.6 liters. Subsequently, the above-mentioned resin mixture was injected at 180° C. and 800 kg/cm² from the injection machine having an injection capacity of 4.8 liters into the mold cavity 11, thereby the pressurized air was discharged completely from the mold cavity. 0.5 Seconds before the completion of the injection, the valve 15 was closed and the exhaust valve 16 was opened to terminate the application of the pressurized air to the mold cavity. 5 Seconds after the completion of the injection, the cavity gap B was enlarged from 5 mm. to 10 mm. in 6 seconds whereby the resin was foamed and expanded. After cooling the mold for 2 minutes, the molded article was taken out of the mold cavity. The surface of the molded article was entirely free from swirl marks and undesirable dents and the cross-section thereof was composed of an outer skin layer of 1.8 mm. in thickness and rough foamed cells of more than 0.3 mm. in diameter. But a large number of the hair cracks were developed after 12 hours from the taking out.

Comparative Example 5

A resin mixture comprising 30 parts by weight of a polystyrene (Styron 683 produced by Asahi Dow Limited), 50 parts by weight of a rubber-reinforced polystyrene (Styron 492 produced by Asahi Dow Limited) and 20 parts by weight of a 6% n-pentane-containing polystyrene having an average molecular weight of 150,000 was homogeneously incorporated with 1.0 part by weight of a commercially available powdery talc and 0.8 part by weight of an azodicarbonamide type blowing agent having a decomposition temperature of 160° C. This resin mixture was subjected to injection molding using the mold shown in FIG. 3. The exhaust valve 16 was closed and the valve 15 was opened to introduce a pressurized air of 8 kg/cm² into the mold cavity 11 having an volume of 3.6 liters. Subsequently, the above-mentioned resin mixture was injected at 180° C. and 800 kg/cm² from the injection machine having an injection capacity of 4.8 liters into the mold cavity 11, thereby the pressurized air was discharged completely from the mold cavity. 0.5 Second before the completion of the injection, the valve 15 was closed and the exhaust valve 16 was opened to terminate the application of the pressurized air to the mold cavity. 5 Seconds after the completion of the injection, the cavity gap B was enlarged from 5 mm. to 10 mm. in 6 seconds whereby the resin was foamed and expanded. After cooling the mold for 2 minutes, the molded article was taken out of the mold cavity. The thus obtained molded article was a foam having an expansion ratio of 1.8. The surface of the molded article had swirl marks and the cross-section thereof was composed of an outer skin layer of 1.0 mm. in thickness and fine foamed cells of 0.05 to 0.2 mm. in diameter.

Comparative Example 6

A resin mixture comprising 50 parts by weight of a polystyrene (Styron 683 produced by Asahi Dow Limited) and 50 parts by weight of a rubber-reinforced polystyrene (Styron 492 produced by Asahi Dow Limited) was incorporated with 1.0 part by weight of a commercially available powdery talc and 0.3 part by weight of an azodicarbonamide type blowing agent having a decomposition temperature of 160° C. This resin mixture was subjected to injection molding using the mold shown in FIG. 3. The exhaust valve 16 was closed and the valve 15 was opened to introduce a pressurized air of 8 kg/cm² into the mold cavity having an inner volume of 3.6 liters. Subsequently, the above-mentioned resin mixture was injected at 180° C. and 800 kg/cm² from the injection machine having an injection capacity of 4.8 liters into the mold cavity 11, thereby the pressurized air was discharged completely from the mold cavity. 0.5 Second before the completion of the injection, the pressure valve 15 was closed and the exhaust valve 16 was opened to terminate the application of the pressurized air to the mold cavity. 5 Seconds after the completion of the injection, the cavity gap B was enlarged from 5 mm. to 10 mm. in 6 seconds, whereby the resin was foamed and expanded. After cooling the mold for 2 minutes, the molded article was taken out of the mold cavity. The surface of the molded article was entirely free from swirl marks and but was undesirable dents, and the cross-section thereof was composed of an outer skin layer of 1.0 mm. in thickness and fine foamed cells of 0.05 to 0.2 mm. in diameter.

EXAMPLE 3

A resin mixture comprising 30 parts by weight of a polystyrene (Styron 683 produced by Asahi Dow Limited), 50 parts by weight of a rubber-reinforced polystyrene (Styron 492 produced by Asahi Dow Limited) and 20 parts by weight of a 6% n-pentane-containing polystyrene having an average molecular weight of 150,000 was incorporated with 1.0 part by weight of a powdery talc and 0.4 part by weight of a hydroxybis-benzenesulfonyl hydrazide type blowing agent having a decomposition temperature of 150° to 160° C. This resin mixture was subjected to the same injection molding as in example 2 to obtain a molded article. The thus obtained molded article was a foam having an expansion ratio of 1.8. The surface of the foam was free from swirl marks and undesirable dents, and the cross-section thereof had an outer skin layer of 1.0 mm. in thickness and fine foamed cells of 0.05 to 0.2 mm. in diameter.

EXAMPLE 4

A resin mixture comprising 80 parts by weight of a styrene-acrylonitrile-butadiene copolymer (Stylac #101 produced by Asahi Dow Limited) and 20 parts by weight of a 5% n-pentane-containing styrene-acrylonitrile copolymer (Tyril 780 produced by Asahi Dow Limited) was incorporated with 1.0 part by weight of a commercially available powdery talc and 0.3 part by weight of an azodicarbonamide type blowing agent having a decomposition temperature of 160° C. This resin mixture was molded in the same manner as in Example 2, except that the injection was conducted at 200° C. and 800 kg/cm² and the cavity gap B was enlarged from 7 mm. to 14 mm., to obtain a molded article. The thus obtained molded foam had an expansion ratio of 1.8. The surface of the foam was a smooth surface entirely free from swirl marks, and the cross-section thereof had an outer skin layer of 1.2 mm. in thickness and fine foamed cells of 0.05 to 0.3 mm. in diameter.

EXAMPLE 5

A resin mixture comprising 90 pars by weight of a styrene-acrylonitrile copolymer (Tyril 780 produced by Asahi Dow Limited) and 10 parts by weight of a 20% Freon R-11-containing Tyril 780 was homogeneously incorporated with 1.0 part by weight of a powdery talc and 0.3 part by weight of an azodicarbonamide type blowing agent having a decomposition temperature of 160° C. This resin mixture was molded in the same manner as in Example 2, except that the injection was conducted at 200° C. and 800 kg/cm² and the cavity gap B was enlarged from 7 mm. to 14 mm., to obtain a molded article. The thus obtained molded foam had an expansion ratio of 1.8. The surface of the foam was a glossy and smooth surface entirely free from swirl marks, and the cross-section thereof had an outer skin layer of 1.2 mm. in thickness and fine foamed cells of 0.05 to 0.3 mm. in diameter.

We claim:
1. A method of producing a foamed thermoplastic resin article having a smooth and glossy surface free from swirl marks and haircracks thereon, said method comprising the steps of:
  (1) melting a thermoplastic resin composition containing, per 100 parts by weight of said resin, 0.5 to 8 parts by weight of a condensable blowing agent having a boiling point of −10° to 70° C. at atmospheric pressure,
  in combination with from 0.05 to 0.5 parts by weight of an organic chemical blowing agent, and
  from 0.5 to 2 parts by weight of an inert nucleating agent;
  (2) applying into a mold cavity a pressurized gas at a pressure of 2 to 10 kg/cm² to prevent foaming of said molten resin when it is injected;
  (3) injecting under a higher pressure, in full shot, the molten resin composition into said gas pressurized mold cavity whereby said pressurized gas is discharged from said mold cavity by said injected resin composition;
  (4) terminating the application of gas under pressure to said mold cavity when said injecting is substantially complete and the mold is filled with the molten resin composition in an unfoamed state;
  (5) permitting the molten resin composition in the mold cavity to form a solid skin layer around the surfaces thereof in contact with the mold wall while maintaining the resin composition within said solid skin layer in the molten state;
  (6) within a period of 10 seconds after injection step (3) above, enlarging the volume of said mold cavity and foaming and expanding, within a period of 10 seconds thereafter, the molten resin composition contained within the solid skin layer, and thereafter;
  (7) cooling and solidifying the thus-formed resin to form the foamed article having a smooth and glossy surface free from swirl marks and haircracks therein.

2. A method according to claim 1, wherein the thermoplastic resin is a styrenic resin.

3. A method according to claim 1, wherein the thermoplastic resin composition contains, per 100 parts by weight of said resin, 1 to 3 parts by weight of the condensable blowing agent and 0.1 to 0.3 part by weight of the organic chemical blowing agent.

4. A method according to claim 1, wherein the pressure of the pressurized gas is 4 to 8 kg/cm².

* * * * *

UNITED STATES PATENT AND TRADEMARK OFFICE
CERTIFICATE OF CORRECTION

PATENT NO. : 4,096,218
DATED : June 20, 1978
INVENTOR(S) : Akio Yasuike and Tsutomu Odagiri It is certified that error appears in the above-identified patent and that said Letters Patent are hereby corrected as shown below:

In the heading correct the following items to read:

"[75] Inventors: Akio Yasuike, Tokyo,
Tsutomu Odagiri, Hiratsuka, both of Japan"

"[73] Assignee: Asahi-Dow Limited and
Toshiba Machine Co. Limited of Tokyo, Japan"

"[63] Continuation-in-part of Ser. No. 379,309,
July 16, 1973, abandoned"

Signed and Sealed this

Fifteenth Day of May 1979

[SEAL]

Attest:

RUTH C. MASON
Attesting Officer

DONALD W. BANNER
Commissioner of Patents and Trademarks